United States Patent [19]

Moldestad

[11] 4,424,741
[45] Jan. 10, 1984

[54] PRESS MACHINE SAFETY APPARATUS

[76] Inventor: Jon P. Moldestad, 1015 Cadillac Way, Burlingame, Calif. 94010

[21] Appl. No.: 322,324

[22] Filed: Nov. 18, 1981

[51] Int. Cl.³ .............................................. B30B 15/06
[52] U.S. Cl. .................................. 100/53; 83/DIG. 1; 83/397; 100/226; 100/295; 192/134
[58] Field of Search .......................... 100/53, 229, 295; 83/DIG. 1, 397, 545; 192/134; 74/612, 613, 614, 615, 616

[56] References Cited

U.S. PATENT DOCUMENTS

| | | | |
|---|---|---|---|
| 3,805,658 | 4/1974 | Scott et al. ............................ | 83/545 |
| 3,942,431 | 3/1976 | Goff ...................................... | 100/53 |
| 4,066,013 | 1/1978 | Skoglund et al. ..................... | 100/53 |

FOREIGN PATENT DOCUMENTS 56-1297  1/1981  Japan ...................................... 100/53

*Primary Examiner*—Billy J. Wilhite
*Attorney, Agent, or Firm*—Kinney, Lange, Braddock, Westman and Fairbairn

[57] ABSTRACT

Safety apparatus for use on press machines of the type including a barrier guard. The apparatus isolates the kinetic energy source from the point of operation by removing a section of the ram whenever the barrier guard opens to provide access to the die area. The ram section is replaced when the barrier guard is closed. The removal and replacement of the removable ram section occurs concurrently with the opening and the closing of the barrier guard.

13 Claims, 8 Drawing Figures

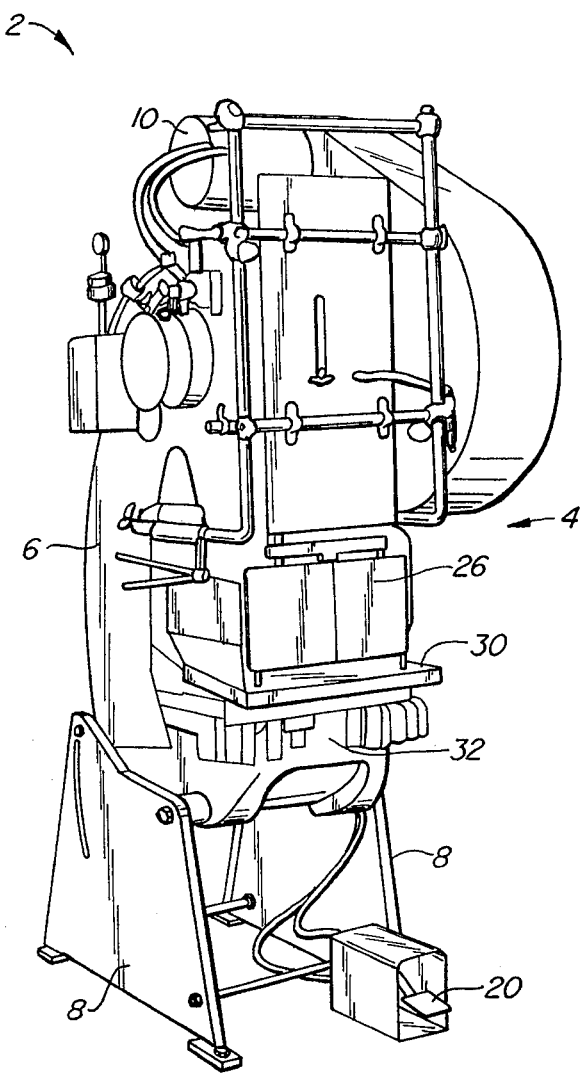
FIG.__1.

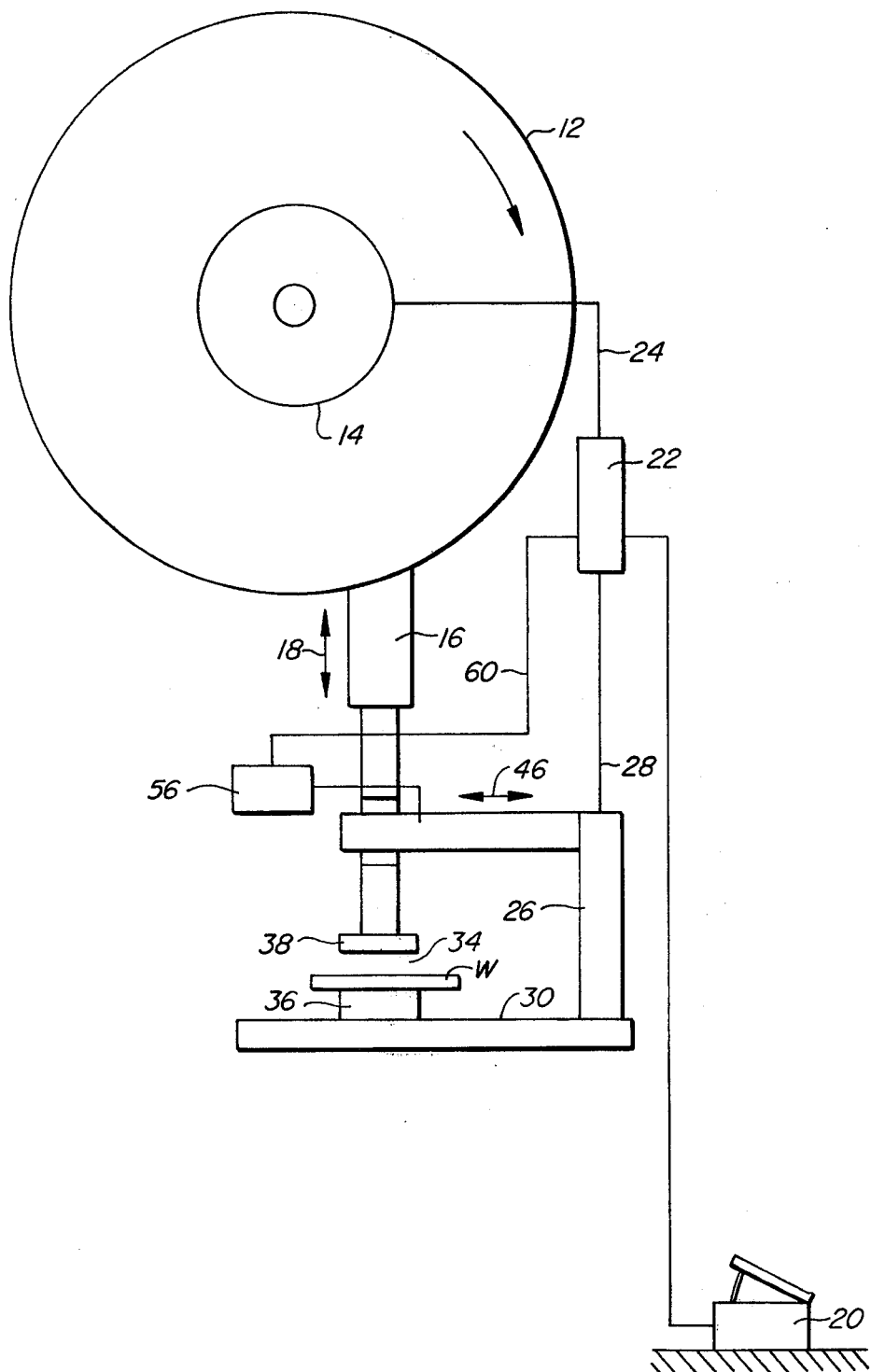
FIG._2.

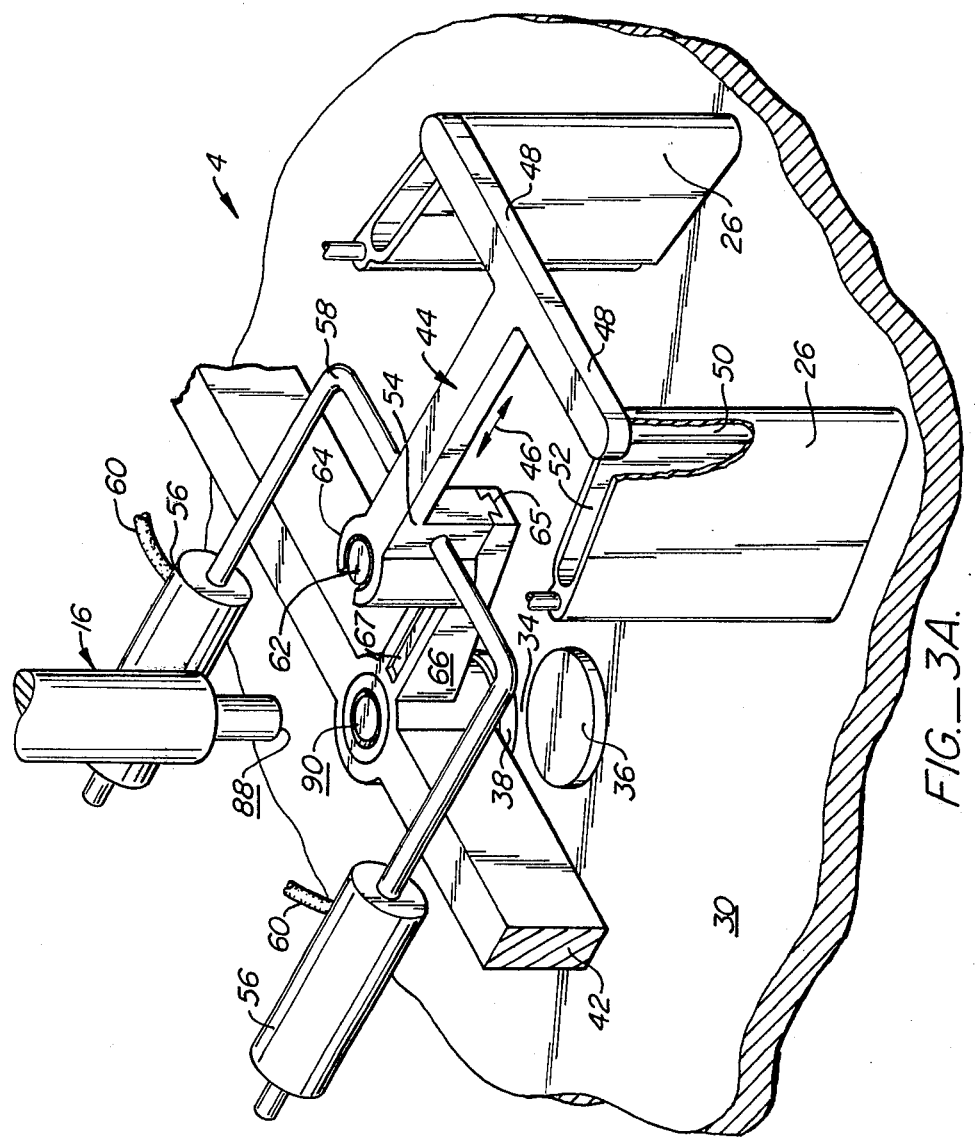
FIG._3A.

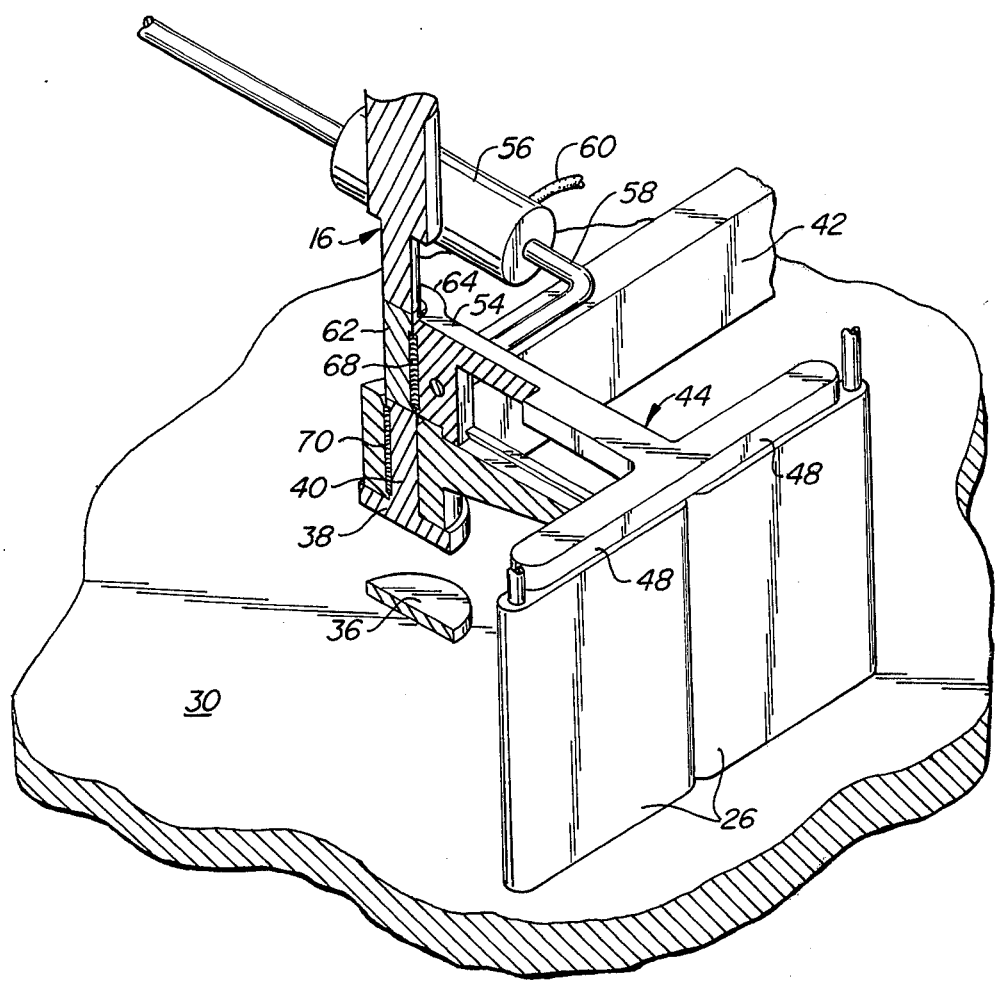
FIG._3B.

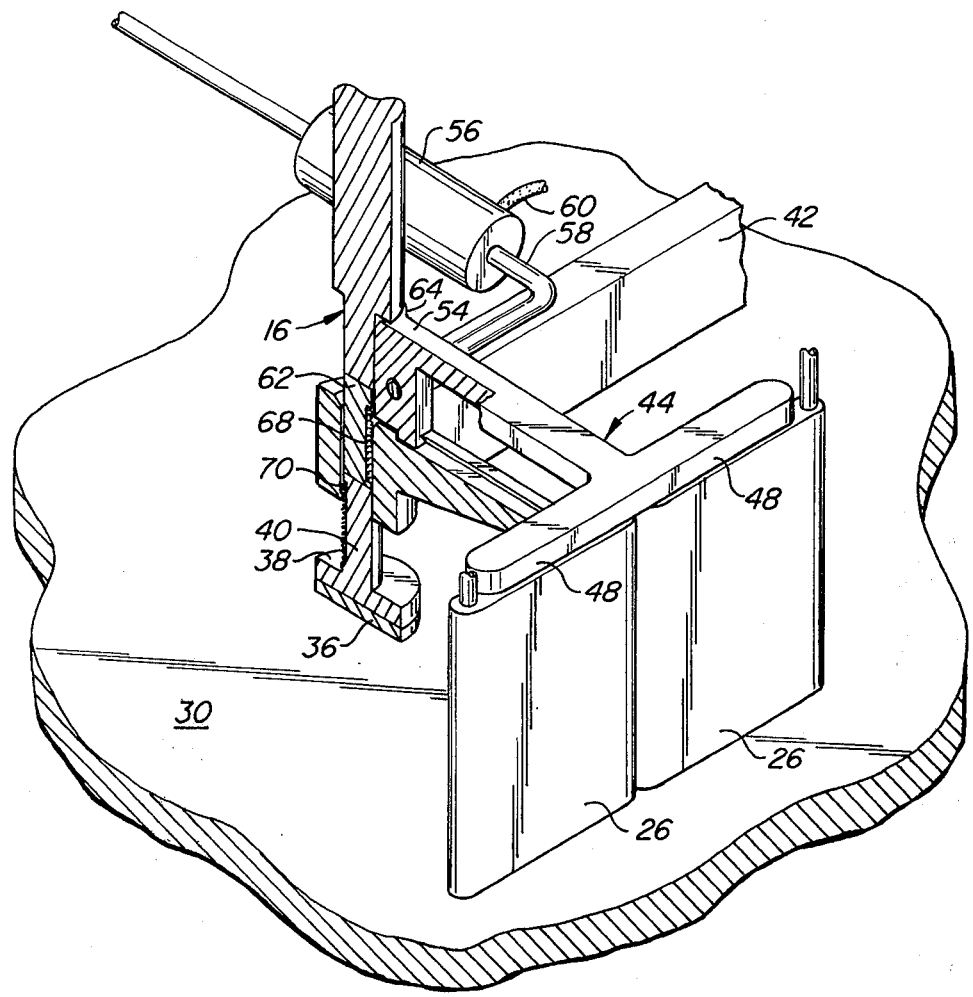
FIG._3C.

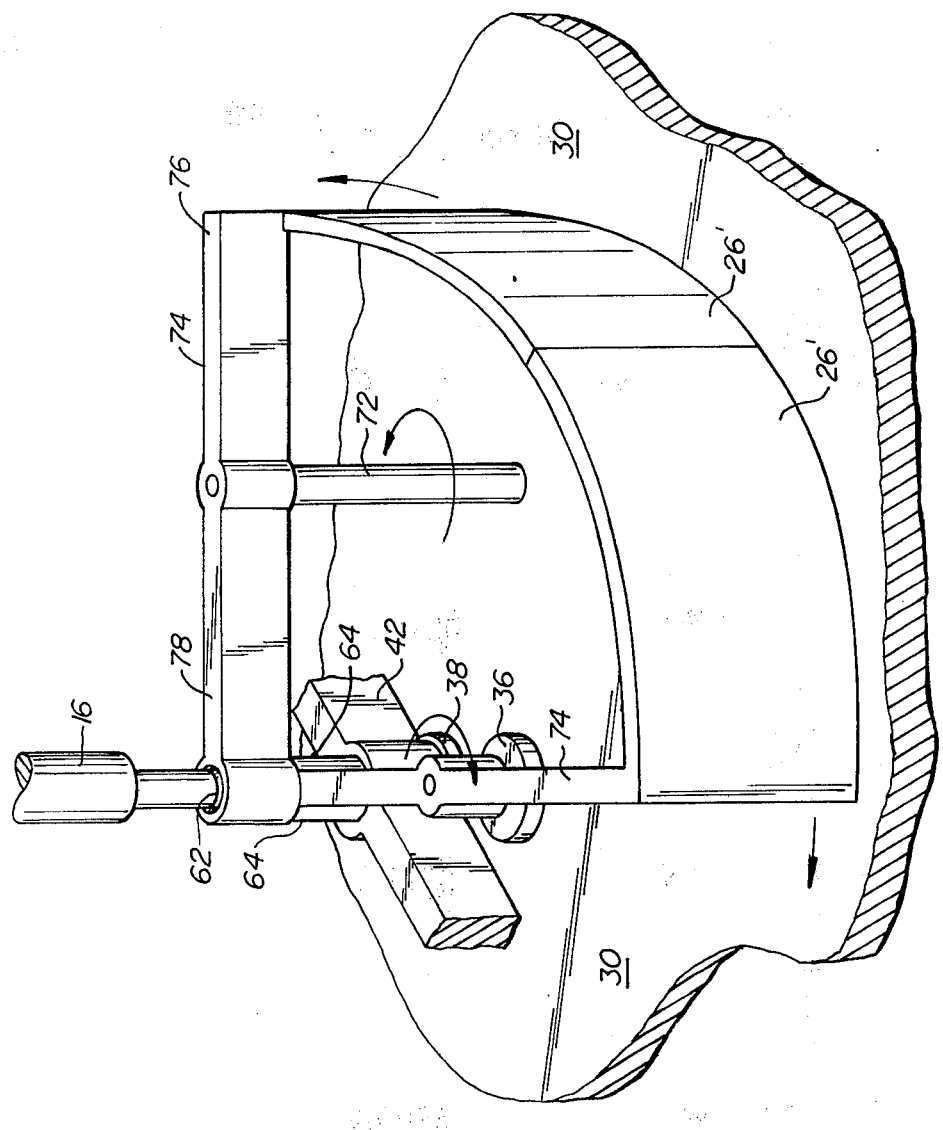
FIG._4.

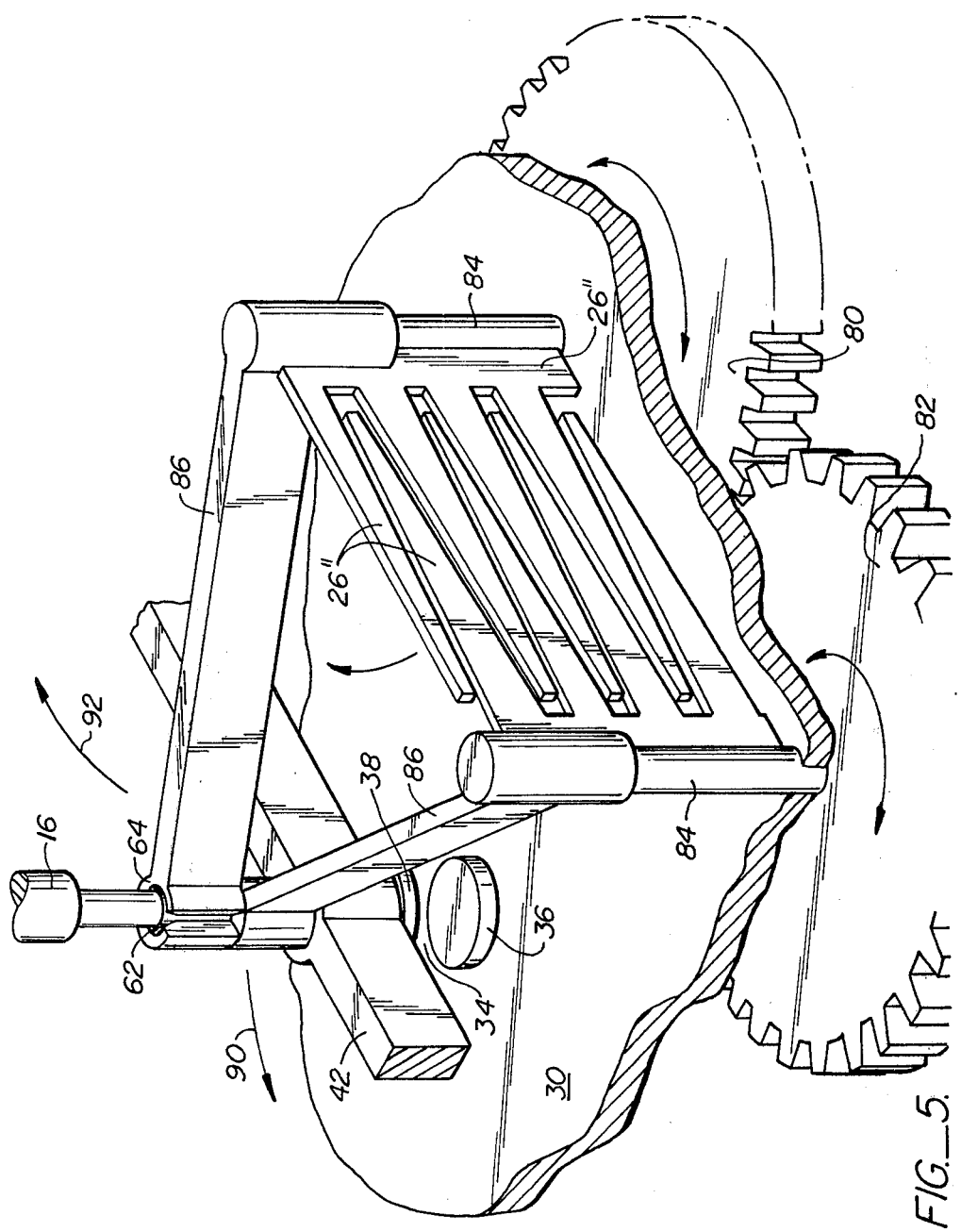
FIG._5.

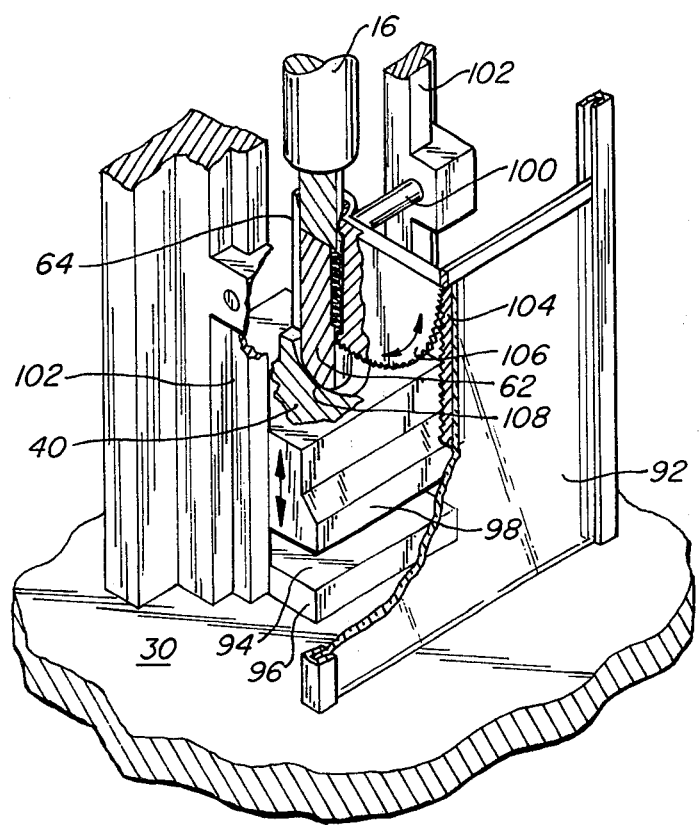
FIG._6.

PRESS MACHINE SAFETY APPARATUS

FIELD OF THE INVENTION

This invention is related to safety devices for power press machines, in particular, safety devices of the interlocked barrier guard type.

BACKGROUND OF THE INVENTION

Power press machines, commonly called punch presses, typically use a flywheel, driven by a relatively small motor, as the kinetic energy source for driving a ram. The lower end of the ram is connected to an upper die. When the ram is cycled or tripped, the flywheel drives the ram downwardly forcing the upper die towards a workpiece placed between the upper die and a lower die.

Press machines are typically provided with an interlocked barrier guard assembly for the safety of the operator. These barrier guard assemblies may include one or two doors or other barriers which must be in place, preventing access to the die area, before the machine is allowed to cycle the ram.

Unfortunately, even press machines with interlocked barrier guard assemblies can be unsafe. Press machines can malfunction so that the ram unexpectedly and unintentionally performs a successive stroke, in what is known as a multiple trip. This type of malfunction can have catastrophic consequences for the operator. Severe industrial accidents, often involving amputation, are an unfortunate but a relatively common result of such a malfunction.

Many accidents also result from the operator intentionally removing or overriding the safety interlocking mechanism on the machine. In addition, when mounting the upper die to the lower end of the ram the machine must often be activated for a partial cycle to jog the ram into position. Unfortunately, sometimes the machine is inadvertently cycled while the operator's hands are in the die area resulting in injury to the operator.

Thus, although the prior art has recognized the dangerous aspects of press machines, until now there has existed no sure way of protecting the operator from injury resulting from multiple trips, malfunctions or operator error.

SUMMARY OF THE INVENTION

Safety apparatus for use on press machines of the type including interlocked barrier guard assemblies is disclosed. The apparatus disables the machine by removing a section of the ram whenever the barrier is opened to provide access to the die area. The movable barrier (typically doors) of the barrier guard assembly of the invention can be opened only when the ram is in the up or retracted position to allow access to the die area. Prior to the actuation of the ram the doors of the barrier guard assembly are closed, thereby replacing the ram section. The removal and replacement of the removable ram section occurs concurrently with the opening and the closing of the doors.

The removable ram section may be enclosed within a collar coupled to the movable doors. Coupling between the doors and the collar is preferably by direct mechanical linkage for increased safety. The length of the ram section removed is sufficient so that even if the press malfunctions or is accidentally cycled while the doors of the barrier guard assembly are open, the displaced removable ram section keeps the upper die from being actuated to insure against injury to the operator. The assembly may also include a pair of removable ram sections, each actuated by the movement of a door of the barrier guard assembly. This provides redundancy for increased safety.

A primary advantage of the present invention is that it insures that so long as the doors of the barrier guard assembly are opened (providing access to the die area), the upper die cannot be driven towards the lower die in the event the machine cycles. This is true because the flywheel is physically isolated from the upper die by the removal of a section of the ram.

The key aspect of the invention is the physical removal of a mechanical link coupling the kinetic energy source and the upper die. This is preferably accomplished by removing a section of the ram. However other mechanical components, such as crankshaft components, could be removed as well depending on the configuration of the particular machine.

Other features and advantages of the present invention will appear from the following description in which the preferred embodiment has been set forth in detail in conjunction with the accompanying drawings.

BRIEF DESCRIPTION OF THE DRAWINGS

FIG. 1 is a perspective view of a press machine, including the press machine safety apparatus of the present invention.

FIG. 2 is a schematic representation showing the functional relationship between the various components of the press machine of FIG. 1.

FIGS. 3A–3C are partial isometric views of a portion of the press machine of FIG. 1 showing the relative position of the ram, removable ram section and barrier guard assembly when the doors are open, when the doors are closed and the ram is in a retracted position, and when the doors are closed and the ram is in a lowered position, respectively.

FIGS. 4–6 are isometric views of alternative embodiments of the invention.

DETAILED DESCRIPTION OF THE PREFERRED EMBODIMENT

Referring now to FIGS. 1 and 2, a press machine 2 incorporating the press machine safety apparatus 4 of the present invention is shown. Machine 2 includes generally a frame 6 supported by legs 8, a motor 10 which drives a flywheel 12 through a clutch 14 to drive a ram 16 along a path parallel to an arrow 18. The machine is operated by pressing down on a foot pedal 20 which is commonly connected to a control panel 22. The control panel activates clutch 14 through an actuation line 24. The control panel senses the position of the doors 26 of safety apparatus 4 through an interlock line 28. Thus, if doors 26 are not in their closed position, control panel 22 will not actuate the clutch 14 through line 24 regardless of the actuation of foot pedal 20.

The press machine thus far described is conventional in structure. Turning now also to FIGS. 3A–3C, safety apparatus 4 of the present invention is shown in three positions. Doors 26 are pivotally mounted to a bolster plate 30 which rests on a bed 32 of machine 2. A die area 34 is designated as the area between a lower die 36 and an upper die 38. Lower die 36 is supported by bolster plate 30 and upper die 38 is supported at the lower end 40 of ram 16. Lower end 40 is guided by a transverse member 42 connected to frame 6.

Doors 26 are moved between the open position shown in FIG. 3A and the closed position shown in FIGS. 3B and 3C by the movement of T-link 44 parallel to arrow 46. T-link 44 includes a pair of arms 48 having actuator rods 50 depending therefrom. One rod 50 passes through a slot 52 in each door 26. A base end 54 is connected to a pair of actuators 56 by a U-bar 58. Actuators 56 are typically hydraulic, but can also be pneumatic or electric, and are controlled by control panel 22 through control lines 60. It should be understood that press machine 2 may be of the type in which the movement of the barrier guard is not dependent upon the position of the ram. In such case doors 26 could include handles, not shown, by which the operator could manually open them between strokes of the ram.

Ram 16 includes a removable ram section 62 which is partially surrounded by a collar 64 mounted to base end 54 of T-link 44. Base end 54 and collar 64 are slidably supported for movement of said ram section 62 between the safe position of FIG. 3A and the punch position of FIGS. 3B and 3C by a T-slot extension 66 of transverse member 42. The upper surface of extension 66 includes a dovetail slot 67 within which a dovetail 65 extending from the lower surface of base end 54 slides.

The lower end 40 and section 62 of ram 16 are both individually biased to the uppermost or retracted position shown in FIG. 3B by springs 68, 70. The springs are held within complementary slots formed between movable ram section 62 and collar 64 and between lower end 40 and transverse member 42, respectively.

In use, the user presses on foot pedal 20 which causes control panel 22 to activate clutch 14 through actuation line 24 after sensing that doors 26 are closed. Clutch 14 couples flywheel 12 to ram 16 to drive ram 16 for a single stroke of the ram. This causes upper die 38 to be driven downwardly towards lower die 36 to form a workpiece W to a desired configuration according to the shape of the dies. After ram 16 has returned to its up or retracted position shown in FIG. 3B, control panel 22 causes actuators 56 to draw removable ram section 62 from the punch position of FIG. 3B to the safe position of FIG. 3A simultaneously with the opening of doors 26 by the movement of T-link 44. The user may then remove the formed workpiece W and insert a new workpiece into die area 34. Foot pedal 20 is again pressed closing doors 26 and replacing section 62 in alignment with ram 16 so that the press cycle can be repeated.

The length of section 16 is sufficient so that even if machine 2 performs a multiple trip when doors 26 are opened, the lower surface 88 of ram 16 will not contact the upper surface 90 of ram 16. Therefore the movement of ram 16 in such a case will not cause upper die 38 to move so that operator safety is assured.

FIG. 4 discloses a second, alternative embodiment of the invention. A pair of pivotally mounted, arcuate doors 26' are each swung outwardly in response to the rotation of an actuator rod 72 and a link 74 joined thereto. One end 76 of each link 74 is connected to a door 26'. A collar 64 is mounted to the opposite end 78 of each link 74. In this embodiment a pair of removable ram sections 62, one for each link 74 and collar 64, are displaced when doors 26' are opened by the rotation of rods 72. Therefore even if one door 26' should malfunction, removal of a ram section by movement of the other door removes a physical link (ram section 62) from between the kinetic energy source (flywheel 12) and the point of operation (upper die 38). By making the length of each section 62 at least as long as the stroke of ram 16, even if only one ram section is missing, ram 16 will not drive upper die 38 into die area 34.

A third embodiment is shown in FIG. 5 and is similar to the embodiment of FIG. 4. Doors 26' are, however, in the form of interlocking fingers. Thus, if only one of the doors fails to close, the other door prevents access to die area 34. In this embodiment, one or the other of meshed gears 80, 82 is rotated to rotate shafts 84 connected thereto. Rotation of shafts 84 cause doors 26' and links 86, carrying collars 64 at their outer ends, to pivot about shafts 84. Thus, when doors 26' are closed, removable ram sections 62 are aligned with ram 16 in a punch position (shown in FIG. 5) and when doors 26' are opened (not shown), links 86 pivot outwardly in the direction of arrows 92, 94 to remove sections 62 to a safe position out of the path of ram 16.

A fourth embodiment is seen in FIG. 6. A vertically sliding door 92 acts as the barrier, when lowered, blocking access to a die area 94 between a lower die 96 and an upper die 98. Ram section 62 is surrounded by collar 64 which is pivotally supported above bolster plate 30 by a pivot rod 100 mounted at its ends to a pair of upright supports 102. Door 92 includes a rack 104 which engages a gear 106 connected to collar 64. While in the first three embodiments the removable ram section is withdrawn from the path of the ram in a straight, radial line, in this fourth embodiment it is removed by being pivoted about the axis of pivot rod 100. To accomodate this pivotal movement, the mating interface 108 of ram section 62 and lower end 40 has a spherical contour which allows ram section 62 to pivot outwardly. Such spherical interface 108 also acts to align ram section 62 and lower end 40.

Although the invention has been described with reference to the disclosed embodiments, modification and variation can be made without departing from the subject of the invention as defined by the following claims. For example, the device could be manually as well as automatically actuated.

What is claimed is:
1. An improved press machine comprising:
a source of kinetic energy;
a lower die;
an upper die, the upper and lower dies being aligned with one another in a die area;
a drive train coupling said source of kinetic energy with said upper die, said drive train including a clutch and at least one removable element between said clutch and said upper die, the removable element being movable between a position in the drive train and a removed position out of the drive train, and the removable element being separate from the upper and lower dies so that movement of the removable element between the position in the drive train and the removed position does not cause movement of the upper die and the lower die; wherein when the removable element is positioned in the drive train kinetic energy can be transmitted from the clutch through the movable element to the upper die to drive the upper die downward toward the lower die, and wherein when the removable element is in the removed position out of the drive train kinetic energy cannot be transmitted from the clutch to the upper die due to an absence of the removable element from the drive train;

movable barrier means for alternatively blocking and permitting user access to said upper and lower dies in the die area; and means, operably coupled to said movable barrier means, for selectively removing said removable element of said drive train from said drive train to the removed position while leaving the upper and lower dies in the die area to operably isolate said source of kinetic energy from said upper die when said movable barrier means permits user access to said upper die.

2. The improved press machine of claim 1 wherein said drive train includes a ram having an upper ram section operably connected to the clutch and a lower ram section operably connected to the upper die and said removable element is a removable intermediate ram section which transmits downward force from the upper ram section to the lower ram section when positioned in the drive train and wherein when the intermediate ram section is in the removed position downward movement of the upper ram section does not transmit downward force to the lower ram section due to the absence of the intermediate ram section.

3. An improved press machine of the type including a movable ram for deforming a workpiece at a die area and a barrier guard assembly including a movable barrier for blocking access to the die area when in a first position during an operating stroke of the ram and for permitting access to the die area when in a second position between the operating strokes, the improvement wherein the ram includes an upper ram section, a lower ram section and a removable intermediate ram section; and additionally comprising means for guiding said removable intermediate ram section between a punch position in which the removable intermediate ram section is aligned with the upper and lower ram sections in a ram stroke path to transmit force from the upper ram section to the lower ram section and a safe position in which the removable intermediate ram section is physically removed from said ram stroke path so that force is not transmitted from the upper ram section to the lower ram section due to absence of the removable intermediate ram section from the ram stroke path; and means responsive to the position of said movable barrier for actuating said guiding means to displace said removable intermediate ram section from said punch position to said safe position when the barrier permits access to the die area and to replace said removable intermediate ram section to said punch position when said barrier blocks access to the die area; and wherein said guiding means includes a collar at least partially surrounding said removable intermediate ram section and means for supporting said collar and removable intermediate ram section therewith along a path between said punch and safe positions.

4. The improved press machine of claim 3 wherein said removable intermediate ram section has a dimension parallel to said ram stroke path of at least the length of the operating stroke of the ram.

5. The improved press machine of claim 3 wherein said path is straight.

6. The improved press machine of claim 3 wherein said actuating means includes a bar member slidably coupled to the barrier at one end and attached to the collar at the other end whereby movement of said barrier moves said one end thereby moving the said other end and said collar and removable intermediate ram section therewith.

7. The improved press machine of claim 3 wherein said actuating means includes a pivotal connecting bar connected at a first end to said collar so that movement of said barrier pivots said connecting bar to move said second end and said collar and removable intermediate ram section therewith along an arcuate path between said punch and safe positions.

8. The improved press machine of claim 3 including a plurality of removable intermediate ram sections.

9. The improved press machine of claim 3 wherein said actuating means includes means for mechanically coupling said movable barrier and said guiding means.

10. A press machine comprising:
a frame including a die area;
a ram movably mounted to said frame for movement along a ram path and including an upper ram section, a lower ram section and a removable intermediate ram section;
an upper die connected to the lower ram section;
a lower die supported by the frame at the die area and aligned vertically below the upper die;
means for selectively driving said upper ram section upward away from said die area to an up position and downward towards said die area to a down position;
movable barrier means for intermittently blocking access to said die area according to the position of said ram;
means for moving said barrier means between a closed position blocking access to said die area and an open positioning permitting access to said die area; and
means for moving said barrier means between a closed position blocking access to said die area and an open position permitting access to said die area; and
means, operably coupled to said barrier means, for displacing said removable intermediate ram section in a generally horizontal direction between a punch position generally aligned with said ram path in which the driving downward of the upper ram section causes downward force to be transmitted through the intermediate ram section to the lower section and a safe position external of said ram path in which driving downward of the upper ram section does not result in the transmission of downward force to the lower ram section due to absence of the intermediate ram section from the ram path so that said intermediate ram section is in said punch position only when said barrier means is in said closed position, the intermediate ram section being separate from the lower ram section, the upper die, and the lower die so that horizontal movement of the intermediate ram section between the punch position and the safe position does not cause horizontal movement of the lower ram section, the upper die and the lower die.

11. The press machine of claim 10 wherein said movable barrier means includes a pair of movable door means.

12. The press machine of claim 10 including a plurality of removable intermediate ram sections.

13. The press machine of claim 10 wherein said displacing means includes mechanical means directly coupling said removable intermediate ram section and said barrier means.

* * * * *